United States Patent [19]

Aoi

[11] Patent Number: 5,448,541
[45] Date of Patent: Sep. 5, 1995

[54] METHOD OF USE FOR AN OPTICAL RECORDING DISK WITH A DYE-CONTAINING RECORDING LAYER AND A TRACKING GUIDE GROOVE

[75] Inventor: Toshiki Aoi, Saku, Japan

[73] Assignee: TDK Corporation, Tokyo, Japan

[21] Appl. No.: 168,414

[22] Filed: Dec. 17, 1993

Related U.S. Application Data

[63] Continuation of Ser. No. 891,092, Jun. 1, 1992, abandoned.

[30] Foreign Application Priority Data

Jun. 6, 1991 [JP] Japan ................... 3-162005
May 22, 1992 [JP] Japan ................... 4-155807

[51] Int. Cl.$^6$ ........................... G11B 7/007
[52] U.S. Cl. ........................... 369/44.26; 369/275.4
[58] Field of Search ............... 369/44.26, 44.35, 44.41, 369/272, 275.4

[56] References Cited

U.S. PATENT DOCUMENTS

| | | | |
|---|---|---|---|
| 4,931,336 | 6/1990 | Haneda ................... | 369/272 |
| 5,060,216 | 10/1991 | Suzuki et al. ............ | 369/44.14 X |
| 5,075,147 | 12/1991 | Vsami et al. ............. | 369/272 |
| 5,080,946 | 1/1992 | Takagis et al. ........... | 428/64 |
| 5,090,009 | 2/1992 | Hamada et al. ........... | 369/284 |

OTHER PUBLICATIONS

National Technical Report; vol. 32, No. 4; 4 Aug. 1986.
Nikkei Electronics; Jan. 23, 1989 (No. 465); p. 107 The Functional Dye Department of the Kinki Chemical Society; Mar. 3, 1989; pp. 15–20.
SPIE; vol. 1078; Optical Recording Topical Meeting (1989); pp. 80–87.

*Primary Examiner*—Aristotelis Psitos
*Assistant Examiner*—Duncan Wilkinson
*Attorney, Agent, or Firm*—Watson, Cole, Grindle & Watson

[57] ABSTRACT

With a dye recording layer having an index of refraction n of 2.0 to 2.6 formed on a substrate, that portion of the recording layer disposed in a groove is used as a recording track by restricting the groove to a width $W_G$ of 0.38 to 0.45 μm and a depth $D_G$ of 1000 to 1700 Å and that portion of the recording layer in the groove to a thickness $T_G$ of at least 2000 Å for $2.0 \leq n \leq 2.3$ or to $W_G$ of 0.38 to 0.45 μm, $D_G$ of 1000 to 2300 Å, and $T_G$ of at least 2500 Å for $2.3 < n \leq 2.6$. Reproduction is performed by means of a CD player which is adapted to perform tracking control by detecting a tracking error signal by the differential phase technique. There is obtained a tracking control loop gain of −2 dB or higher relative to that of commercially available CD, ensuring stable and accurate tracking control.

2 Claims, 3 Drawing Sheets

METHOD OF USE FOR AN OPTICAL RECORDING DISK WITH A DYE-CONTAINING RECORDING LAYER AND A TRACKING GUIDE GROOVE

This application is a File Wrapper Continuation Application of application Ser. No. 07/891,092, filed 1 Jun. 1992 now abandoned.

FIELD OF THE INVENTION

This invention relates to an optical recording disk of the write-once type which can be reproduced by means of a reproducing machine of the compact disk (abbreviated as CD) standard capable of precisely detecting tracking errors in accordance with the differential phase technique and an optical recording/reproducing method.

BACKGROUND OF THE INVENTION

Among the tracking error detecting systems used for CD are a three beam system and a single beam system including push-pull and differential phase techniques.

The three beam system uses a main beam and two sub-beams and measures a change in the intensity of reflected light from a pitted surface of the disk by means of a photodetector. Despite of reliable operation, the three beam system requires a diffraction grating or the like due to the use of sub-beams, adding to the complexity of the optical system and is less effective in the utilization of laser output. Since the main beam and the sub-beams must be separated, only a limited area of the photodetector is available for RF signals so that the photodetector may not fully receive scattering light. The system is thus weak against such defects as fingerprints and fogs on the disk.

In contrast, the single beam system including push-pull and differential phase techniques imposes no limit on the area of a photodetector which can receive more scattering light as compared with the three beam system, reducing a drop of RF signal.

Among the single beam system, the push-pull technique acquires a tracking error signal by utilizing the fact that the intensity distribution of a light beam which has been diffracted and reflected by a pit and re-entered the objective changes with a relative positional change between the pit and a beam spot. Using a photodetector divided into two segments, the difference between the segments is determined. When the beam is positioned coincident with the information format, the intensity distribution is equal between the left and the right. When this positional relationship is offset, the intensity distribution becomes asymmetric between the left and the right. Since this asymmetry is reversed depending on the positional relationship between the beam and the pit, one polarity corresponding to the beam offset to one side of the pit is available as a tracking error signal.

Nevertheless, the push-pull technique has several drawbacks. No tracking error signals are available at a pit depth equal to $\lambda/4$ wherein $\lambda$ is a wavelength because the intensity distribution becomes an metric pattern at that pit depth. When a pickup of the slide type is used, a DC offset is introduced into the tracking error signal. Thus in the event of skew adjustment, automatic gain adjustment should be carried out by causing a sine wave of minute amplitude to overlap the tracking error signal.

The differential phase technique of the single beam system was proposed in order to eliminate the drawbacks of the three beam system and the push-pull technique. (See National Technical Report, Vol. 32, No. 4, Aug. 1986.)

The differential phase technique is to detect a tracking error from a phase difference which is introduced in a photodetector signal by the positional relationship between a pit and a beam spot. A tracking error signal is acquired by determining the intensity distribution of reflected light from the pit through Fourier conversion, carrying out ray tracing using the reflected light as an incident ray, determining the intensity distribution on a photodetector which is divided into four segments, converting diagonally added signals from the photodetector into digital waveforms by means of comparators, respectively, and passing pulses corresponding to the phase difference between the digital waveforms through an integration circuit for converting them into an analog waveform.

There was proposed an optical recording disk which is once-writable or recordable in accordance with the CD standard. See Nikkei Electronics, Jan. 23, 1989, No. 465, p. 107; the Functional Dye Department of the Kinki Chemical Society, Mar. 3, 1989, Osaka Science & Technology Center; and SPIE, Vol. 1078, Optical Data Storage Topical Meeting, 80, 1989.

This disk has a dye layer, a reflective gold layer, and a protective layer disposed on a transparent resin substrate in this order. That is, the reflective layer is in close contact with the dye layer. As opposed to the prior art disk of the structure wherein an air space is provided on a dye layer in order to allow pits to be formed in the dye layer, the newly proposed disk is of the close contact type wherein the reflective layer is close to the dye layer, meeting the total disk thickness of 1.2 mm required by the CD standard. It is to be noted that the substrate is formed with a spiral groove for tracking at a pitch of about 1.6 $\mu$m, with that portion of the dye layer in the groove serving as a recording track.

If the differential phase technique is applied to such optical recording disks for tracking error detection, there arise serious problems including a low tracking control loop gain, a low output level available to the servo system which becomes unstable, an increased access time associated with chapter search, and inaccurate chapter search resulting in search errors.

DISCLOSURE OF THE INVENTION

A primary object of the present invention is to provide an optical recording disk of the dye base, close contact type and an optical recording/reproducing method, which allow a tracking error to be detected with high precision in accordance with the differential phase technique.

This and other objects are accomplished by the present invention defined below as (1) to (6).

(1) An optical recording disk comprising a dye-containing recording layer on a substrate having a tracking groove and a reflective layer stacked on the recording layer wherein recording light is directed to that portion of the recording layer disposed in the groove to form a recorded site and reproduction is performed by means of a compact disk player, wherein said compact disk player is adapted to detect a tracking error signal by the differential phase technique, and the disk produces a tracking control loop gain of −2 dB or higher relative to that of a commercially available compact disk upon reproduction.

(2) The optical recording disk of (1) wherein said recording layer has an index of refraction n of 2.0 to 2.3, said groove has a width $W_G$ of 0.38 to 0.45 μm and a depth $D_G$ of 1000 to 1700 Å, and that portion of the recording layer disposed in the groove has a thickness $T_G$ of at least 2000 Å.

(3) The optical recording disk of (1) wherein said recording layer has an index of refraction n of more than 2.3 to 2.6, said groove has a width $W_G$ of 0.38 to 0.45 μm and a depth $D_G$ of 1000 to 2300 Å, and that portion of the recording layer disposed in the groove has a thickness $T_G$ of at least 2500 Å.

(4) An optical recording/reproducing method using an optical recording disk comprising a dye-containing recording layer on a substrate having a tracking groove and a reflective layer stacked on the recording layer wherein said recording layer has an index of refraction n of 2.0 to 2.3, said groove has a width $W_{Go}$ of 0.38 to 0.45 μm and a depth $D_G$ of 1000 to 1700 Å, and that portion of the recording layer disposed in the groove has a thickness $T_G$ of at least 2000 Å, said method comprising the steps of:

performing recording by directing recording light to that portion of the recording layer disposed in the groove to form a recorded site and performing reproduction by using a compact disk player to emit reproducing light while detecting a tracking error signal by the differential phase technique.

(5) An optical recording/reproducing method using an optical recording disk comprising a dye-containing recording layer on a substrate having a tracking groove and a reflective layer stacked on the recording layer wherein said recording layer has an index of refraction n of more than 2.3 to 2.6, said groove has a width $W_G$ of 0.38 to 0.45 μm and a depth $D_G$ of 1000 to 2300 μ, and that portion of the recording layer disposed in the groove has a thickness $T_G$ of at least 2500 μ, said method comprising the steps of:

performing recording by directing recording light to that portion of the recording layer disposed in the groove to form a recorded site and performing reproduction by using a compact disk player to emit reproducing light while detecting a tracking error signal by the differential phase technique.

(6) The optical recording/reproducing method of (4) or (5) wherein the tracking error signal is acquired by leading the reflected light of the reproducing light to a photodetector which is divided into four segments, determining the intensity distribution on the respective photodetector segments, converting diagonally added signals into digital waveforms by means of comparators, respectively, and passing pulses corresponding to the differential phase between the digital waveforms through an integration circuit for converting them into an analog waveform.

OPERATION AND BENEFITS

When prior art optical recording disks of the dye base, close contact type were reproduced by means of a CD player and a tracking error was detected by the differential phase technique, the disks could not produce a tracking control loop gain of −2 dB or higher relative to that of commercially available CD's. This is because no considerations were made to the width and depth of the groove and the thickness of the recording layer in the tracking groove.

The present invention ensures stable, accurate tracking control.

ILLUSTRATIVE CONSTRUCTION

Figure 1:
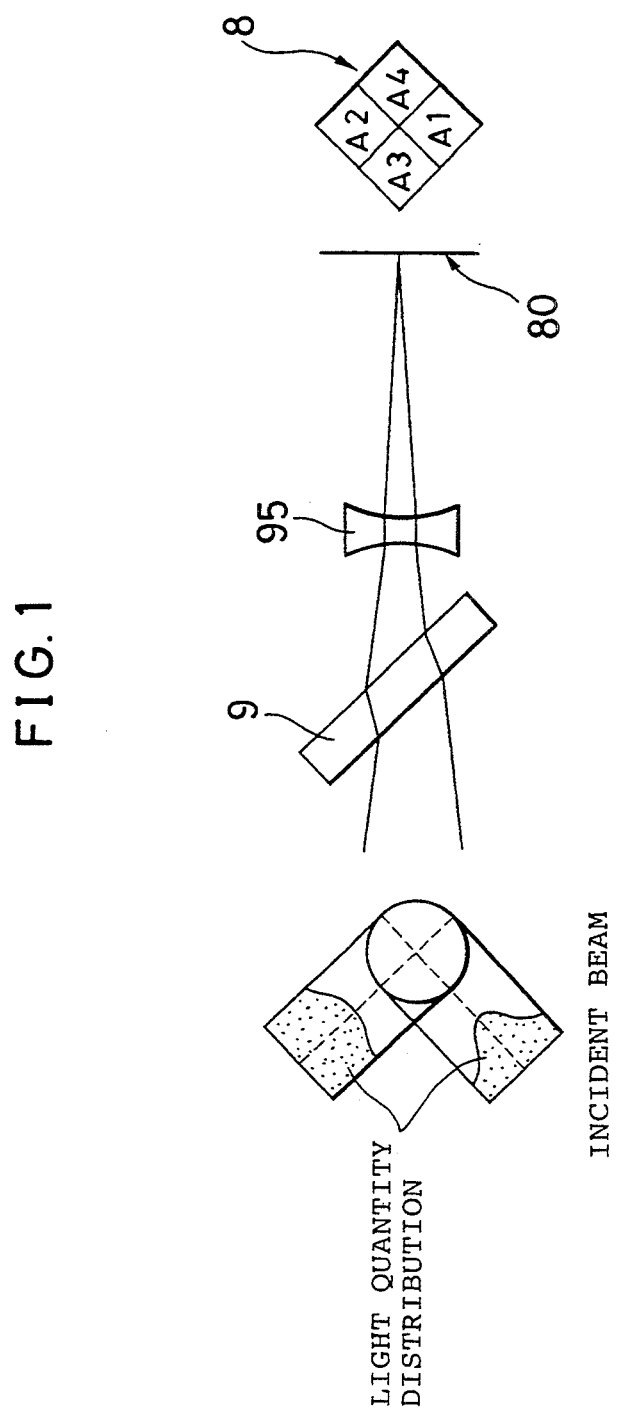
FIG. 1 is a schematic illustration of an optical system for detecting a tracking error signal in accordance with the differential phase technique.
Figure 2:
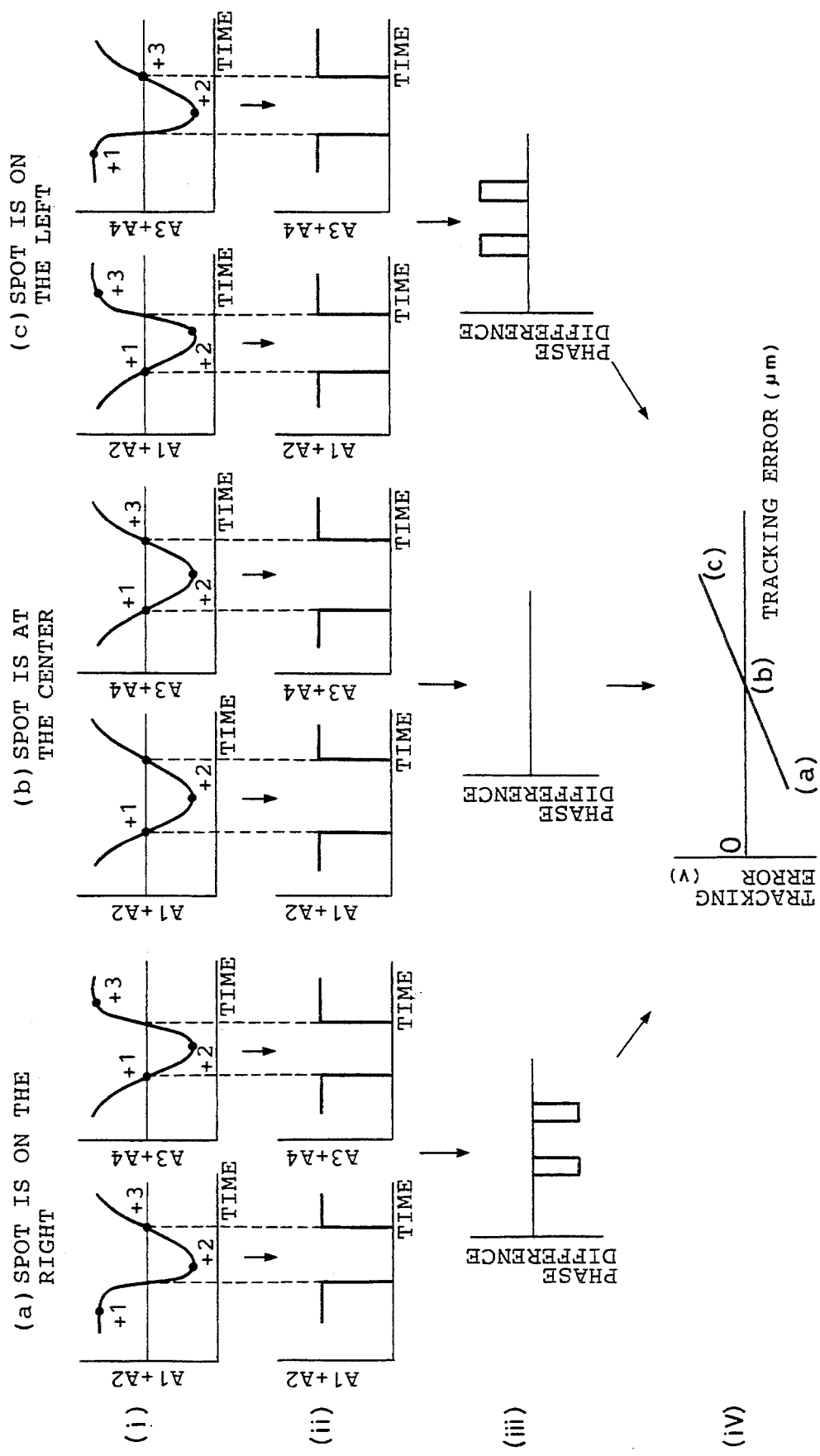
FIG. 2 is a diagram for illustrating electric signal processing associated with the tracking error signal detection in accordance with the differential phase technique.

The illustrative construction of the present invention is now described in further detail. Referring to FIGS. 1 and 2, it is first described how to detect a tracking error signal in accordance with the differential phase technique.

The differential phase technique contemplated in the present invention is of the single beam system wherein an incident beam is led to a photodetector 8 through a half mirror 9 as shown in FIG. 1. The half mirror 9 is preferably a plate half mirror in the illustrated embodiment for leading the incident beam and a beam reflected from the disk through a focusing lens (not shown) to a photodetector surface 80 through a concave lens 95. Accordingly, the focusing error detection employs the astigmatic system.

As shown in FIG. 1, the photodetector 8 is divided into four segments which produce signals A1 to A4, respectively. The signals of the photodetector 8 of FIG. 1 are diagonally added to provide signals (A1+A2) and (A3+A4) as shown in FIG. 2(i). The diagonally added signals are converted into digital waveforms by comparators, respectively, as shown in FIG. 2(ii). Pulses corresponding to the phase difference between (A1+A2) and (A3+A4) are then obtained as shown in FIG. 2(iii). The pulses are passed through an integration circuit to draw an analog waveform as shown in FIG. 2(iv), from which a tracking error signal is extractable.

As shown in FIG. 2, the location of a beam spot at the center of a track provides a tracking error signal of zero. If the spot is at the right or left of the track, then there is obtained a tracking error signal of negative or positive value. The tracking control loop gain is defined as the gradient of the tracking error signal curve (tracking error in μm vs phase difference in deg.) at zero point.

The disk according to the present invention is designed such that when the disk having information already recorded therein is reproduced by a CD reproducing machine or player adapted to perform tracking in accordance with the differential phase technique, provided that a commercially available CD upon reproduction provides a tracking control loop gain of 0 dB, the disk produces a tracking control loop gain of =2 dB or higher relative to that of the commercial CD.

Such a gain can be accomplished by designing the optical recording disk such that if the recording layer has an index of refraction (the real part of a complex index of refraction) n of 2.0 to 2.3, the tracking groove has a width $W_G$ of 0.38 to 0.45 μm, preferably 0.38 to 0.43 μm, the groove has a depth $D_G$ of 1000 to 1700 Å, and that portion of the recording layer disposed in the track or groove has a thickness $T_G$ of at least 2000 Å, preferably 2000 to 3000 Å, more preferably 2000 to 2500 Å. Then the inventive disk generally provides a gain of =2 to 0 dB relative to that of the commercial CD. Alternatively, such a gain can be accomplished by designing the optical recording disk such that if the recording layer has an index of refraction (the real part of a complex index of refraction) n of more than 2.3 to 2.6, the tracking groove has a width $W_G$ of 0.38 to 0.45 μm, preferably 0.38 to 0.43 μm, the groove has a depth $D_G$ of 1000 to 2300 Å, preferably 1200 to 2300 Å, and that portion of the recording layer disposed in the track or groove has a thickness $T_G$ of at least 2500 Å, preferably 2500 to 3000 Å. Then the inventive disk generally provides a gain of −2 to 0 dB relative to that of the commercial CD. In either embodiment, the gain will lower if any parameter is outside the above-defined range.

Tracking error detection with such a high gain achieves stable tracking control, accurate chapter search and a short access time.

Figure 3:
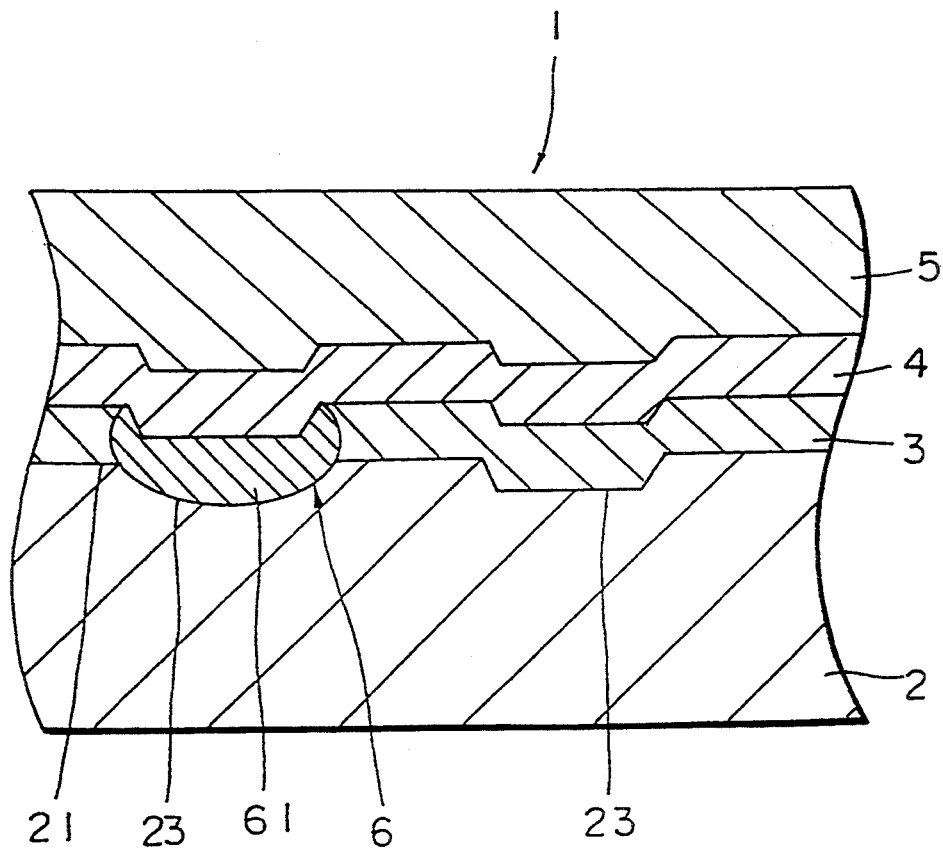
FIG. 3 is a sectional view of an optical recording disk according to the present invention.

FIG. 3 illustrates one preferred embodiment of the optical recording disk of the present invention. The optical recording disk 1 is of the close contact type including a recording layer 3 containing a dye on a substrate 2, a reflective layer 4 in close contact with the recording layer 3 and a protective layer 5 thereon.

The substrate 2 are formed of various resins which are substantially transparent to recording and reproducing light (780 nm), preferably having a transmittance of at least 80%, so that recording and reproducing operation may be made through the substrate. The substrate 2 is disk-shaped and has a thickness of about 1.2 mm and a diameter of about 80 to about 120 mm.

One surface of the substrate 2 where the recording layer 3 is to be formed is provided with a tracking groove 23. The groove 23 is preferably a spiral continuous groove whose depth and width are preferably restricted as previously defined. A groove pitch of 1.5 to 1.7 μm is preferred.

In the practice of the present invention, if the substrate 2 has a groove, recording light is directed to that portion of the recording layer 3 which is disposed in the groove 23. That is, the optical recording medium of the present invention is preferably an optical recording medium of the groove recording type which allows the recording layer to have an increased effective thickness.

The recording layer 3 contains any of various well-known dyes such as cyanine dyes. The recording layer may have a coefficient of extinction k (the imaginary part of a complex index of refraction) of 0.01 to 0.05 at the wavelength of recording and reproducing light. If k is less than 0.01, the recording layer would lower its absorptivity to a level at which recording with normal power becomes difficult. If k is beyond 0.05, the reflectivity would fall down below 70% to make it difficult to reproduce in accordance with the CD standard. The index of refraction (the real part of a complex index of refraction) n is from 2.0 to 2.6 as previously mentioned. With n<2.0, the reflectivity would lower to provide reproduced signals of reduced magnitude, making it difficult to reproduce in accordance with the CD standard. It will be understood that the recording layer 3 may be formed by coating a solution of the dye.

In the present invention, that portion of the recording layer 3 which is disposed in the groove 23 forms a recording track and has a thickness $T_G$ as previously defined. It is to be noted that that portion of the recording layer 3 which is disposed on the land between the adjacent grooves 23 has a thickness of about 1000 to 2300 Å, especially about 1000 to 1700 Å.

In close contact with the recording layer 3 is disposed the reflectively layer 4. The reflective layer 4 may be formed of a high reflectivity metal or alloy such as Au, Ag, Cu or alloys thereof. The reflective layer 4 preferably has a thickness of at least 500 Å and may be formed by evaporation, sputtering or the like. The upper limit of the reflective layer thickness is not critical although it is preferably up to about 1200 Å in consideration of manufacturing cost and time. Then the reflective layer 4 exhibits a reflectivity of at least 90% by itself and provides the medium with a reflectivity of at least 60%, especially at least 70% when irradiated through the substrate and the unrecorded portion.

Preferably, the protective layer 5 is disposed on the reflective layer 4. The protective layer 5 may be formed of various resin materials, for example, UV-curable resins, often to a thickness of about 0.5 to 30 μm, especially about 1 to 10μm. The protective layer 5 may be either a layer or a sheet. Preferably the protective layer 5 is a coating comprised of a radiation-curable compound and a photo-polymerization sensitizer which is cured with radiation. The protective layer 5 preferably has such hardness that the pencil hardness at 25° C. according to JIS K-5400 is in the range of H to 8H, especially 2H to 7H.

The optical recording disk 1 of the above-mentioned structure may be recorded or written once by directing pulses of recording light at 780 nm to the recording layer 3 through the substrate 2. Then the recording layer 3 absorbs the light to generate heat while the substrate 2 is heated at the same time. As a consequence, the material of which the recording layer 3 is formed, typically dye is melted and decomposed in the vicinity of the interface between the substrate 2 and the recording layer 3.

Then a decomposition layer 61 comprised of melted and decomposed products of the recording layer 3 is left on the bottom of the groove 23. The decomposition layer 61 invades the substrate side to form a pit 6 of expanded configuration. The decomposition layer 61 is substantially free of the substrate material and consists essentially of decomposed products of the recording layer material or a mixture of decomposed products of the recording layer material and the recording layer material. It is to be noted that the recording light has a power of about 5 to 9 mW and the substrate is rotated at a linear velocity of about 1.2 to 1.4 m/s.

After minute recorded sites or pits 6 are formed in this way, reproducing light at 780 nm is directed thereto through the substrate 2 whereby the light reflected by the pit 6 has a phase difference from the light reflected by the unrecorded portion or land 21 and provides a reduced reflection level upon reproduction of up to 40%, especially up to 20% of that of the unrecorded portion. This enables reproduction in accordance with the CD standard since the unrecorded portion retains a high reflectivity of at least 60%, especially at least 70%. It is to be noted that the reproducing light has a power of about 0.1 to 1.0 mW.

EXAMPLE

Examples of the present invention are given below by way of illustration.

Example 1

Polycarbonate was injection molded into a substrate having a diameter of 120 nm and a thickness of 1.2 mm. The substrate on one surface to bear a recording layer was formed with a tracking groove having a width of 0.42 μm and a depth of 1550 Å at a pitch of 1.6 μm. A recording layer containing a cyanine dye was formed on the resin substrate by spin coating. The dye recording layer had a thickness of 2400 Å in the groove and 1400 Å on the land. The dye recording layer had a n of 2.2 and a k of 0.020.

On the recording layer, an Au coating was deposited to a thickness of 1000 Å to form a reflective layer. A UV-curable composition was coated on the reflective layer to a thickness of 5 μm to form a protective layer, completing an optical recording disk. CD signals were recorded in the optical recording disk using recording light having a wavelength of 780 nm and a power of 7 mW.

The optical recording disk was reproduced by a CD player adapted to detect a tracking error by the differential phase technique (SL-PS30 manufactured by Matsushita Electric K.K.), resulting in satisfactory performance free of search errors or skips.

The optical recording disk was reproduced to measure a differential phase tracking control loop gain which was −1.0 dB relative to that of a commercially available CD.

Example 2

In Example 1, the groove width $W_G$, groove depth $D_G$, and the in-groove thickness of the recording layer $T_G$ were changed as reported in Table 1. The tracking control loop gain G was measured. The results are shown in Table 1.

TABLE 1

| Sample No. | $W_G$ (μM) | $D_G$ (Å) | $T_G$ (Å) | G |
|---|---|---|---|---|
| | (n = 2.2) | | | |
| 1 (Invention) | 0.42 | 1550 | 2400 | −1.0 |
| 2 (Invention) | 0.44 | 1650 | 2400 | −2.0 |
| 3 (Comparison) | 0.48 | 1650 | 2400 | −2.3 |
| 4 (Comparison) | 0.50 | 1200 | 2000 | −2.5 |
| 5 (Comparison) | 0.42 | 2200 | 2800 | −4.0 |
| 6 (Comparison) | 0.35 | 1550 | 2200 | −2.3 |

It is evident from Table 1 that a gain G of −2.0 dB or higher is obtained by restricting $W_G$, $D_G$ and $T_G$. With gains of lower than −2.0 dB relative to the gain of commercial CD, tracking control was inaccurate and errors occurred in searching the starting point of a recorded tune.

Example 3

In Example 1, the cyanine dye was replaced by another cyanine dye to provide the recording layer with n=2.4 and k=0.025 and the groove width $W_G$, groove depth $D_G$, and the in-groove thickness of the recording layer $T_G$ were changed as reported in Table 2. The tracking control loop gain G was measured. The results are shown in Table 2.

TABLE 2

| Sample No. | $W_G$ (μM) | $D_G$ (Å) | $T_G$ (Å) | G |
|---|---|---|---|---|
| | (n = 2.4) | | | |
| 11 (Invention) | 0.42 | 1700 | 2700 | −1.5 |
| 12 (Invention) | 0.44 | 2100 | 2800 | −1.8 |
| 13 (Comparison) | 0.48 | 1700 | 2700 | −2.2 |
| 14 (Comparison) | 0.50 | 1500 | 2600 | −2.3 |
| 15 (Comparison) | 0.42 | 2400 | 2900 | −3.0 |
| 16 (Comparison) | 0.35 | 1800 | 2700 | −2.3 |

It is evident from Table 2 that a gain G of higher than −2.0 dB is obtained by restricting $W_G$, $D_G$ and $T_G$.

I claim:

1. An optical recording/reproducing method using optical recording disk comprising a dye-containing recording layer on a substrate having a tracking groove and a reflective layer stacked on the recording layer wherein said recording layer has an index of refraction n of 2.0 to 2.3, said groove has a width $W_G$ of 0.38 to 0.45 um and a depth $D_G$ of 1000 to 1700 Å, and that portion of the recording layer disposed in the groove has a thickness $T_G$ of at least 2000 Å, said method comprising the steps of:
   recording by directing recording light to that portion of the recording layer disposed in the groove to form a recorded site;
   reproducing the recorded data by using a compact disk player to emit reproducing light while detecting a tracking error signal by a differential phase technique for acquiring the tracking error signal, comprising the steps of;
   generatingq a group of four signals by reflecting reproducing light to a photodetector which is divided into four segments;
   adding the group of four signals diagonally to produce two added signals;
   converting the diagonally added signals into digital differential phase waveforms by means of respective comparators; and integrating the digital differential phase waveforms by an integration circuit for conversion into an analog waveform containing a tracking error signal.

2. An optical recording/reproducing method using an optical recording disk comprising a dye-containing recording layer on a substrate having a tracking groove and a reflective layer stacked on the recording layer wherein said recording layer has an index of refraction n of more than 2.3 to 2.6, said groove has a width $W_G$ of 0.38 to 0.45 um and a depth $D_G$ of 1000 to 2300 Å, and that portion of the recording layer disposed in the groove has a thickness $T_G$ of at least 2500 Å, said method comprising the steps of:
   recording by directing recording light to that portion of the recording layer disposed in the groove to form a recorded site;
   reproducing the recorded data by using a compact disk player to emit reproducing light while detecting a tracking error signal by a differential phase technique for acquiring the tracking error signal, comprising the steps of;
   generating a group of four signals by reflecting reproducing light to a photodetector which is divided into four segments;
   adding the group of four signals diagonally to produce two added signals;
   converting the diagonally added signals into digital differential phase waveforms by means of respective comparators; and
   integrating the digital differential phase waveforms by an integration circuit for conversion into an analog waveform containing a tracking error signal.

* * * * *

UNITED STATES PATENT AND TRADEMARK OFFICE
CERTIFICATE OF CORRECTION

PATENT NO. : 5,448,541
DATED : September 5, 1995
INVENTOR(S) : Toshiki AOI

It is certified that error appears in the above-identified patent and that said Letters Patent is hereby corrected as shown below:

Column 8, line 30, delete "generatingq" and insert --generating--

Signed and Sealed this

Twenty-first Day of November, 1995

BRUCE LEHMAN

Attest:

Attesting Officer

Commissioner of Patents and Trademarks